United States Patent [19]

Fukasawa et al.

[11] Patent Number: 5,135,973

[45] Date of Patent: Aug. 4, 1992

[54] FLAME-RETARDANT POLYESTER RESIN COMPOSITION

[75] Inventors: Jun Fukasawa; Matsushi Kogima; Hayato Kurita, all of Shizuoka, Japan

[73] Assignee: Polyplastics Co., Ltd., Osaka, Japan

[21] Appl. No.: 483,943

[22] Filed: Feb. 23, 1990

[30] Foreign Application Priority Data

Feb. 27, 1989 [JP] Japan .................................. 1-45971

[51] Int. Cl.$^5$ .......................... C08K 5/523; C08K 7/20
[52] U.S. Cl. ..................................... 524/94; 524/127; 524/371; 524/411; 524/412; 524/493
[58] Field of Search ................ 524/127, 411, 412, 94, 524/371, 493

[56] References Cited

U.S. PATENT DOCUMENTS

| | | | |
|---|---|---|---|
| 3,624,024 | 11/1971 | Caldwell et al. | 524/451 |
| 3,859,246 | 1/1975 | Jackson et al. | 524/451 |
| 3,987,008 | 10/1976 | Stackman | 524/127 |
| 4,124,561 | 11/1978 | Phipps et al. | 524/451 |
| 4,203,888 | 5/1980 | Rashbrook | 524/127 |
| 4,343,732 | 8/1982 | Zama et al. | 524/127 |
| 4,612,344 | 9/1986 | Breitenfellner | 524/493 |
| 4,672,086 | 6/1987 | Seiler et al. | 524/139 |

FOREIGN PATENT DOCUMENTS 0133641 3/1985 European Pat. Off. .

OTHER PUBLICATIONS

Robert W. Stackman "Phosphorus Based Additives for Flame Retardant Polyester. 2. Polymeric Phosphorus Esters" Industrial Engineering Chemistry, Prod. Res. Dev., vol. 21, No. 2, 332-336 (1982).

Primary Examiner—Veronica P. Hoke
Attorney, Agent, or Firm—Nixon & Vanderhye

[57] ABSTRACT

A flame-retardant polyester resin composition includes a thermoplastic polyester resin, between 1 to 30 wt. % of an organic halogenated flame-retardant, between 5 to 60 wt. % of an inorganic filler, and between 0.5 to 20 wt. % of a phosphoric ester of the following formula (1):

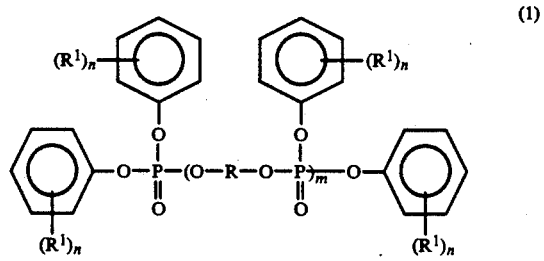

wherein R represents a divalent organic group, R' which may be the same or different, is selected from $C_1$ to $C_{20}$ aliphatic groups, $C_3$ to $C_{13}$ alicyclic groups and $C_6$ to $C_{18}$ aromatic groups, m represents a number of 1 to 30, and n represents an integer of 0 to 3.

1 Claim, No Drawings

FLAME-RETARDANT POLYESTER RESIN COMPOSITION

FIELD OF INVENTION

The present invention relates to a flame-retardant polyester resin composition. More particularly, the present invention relates to a resin composition having improved impact resistance and tenacity, without impairment of its other desirable properties, such as mechanical, electrical and flame retardant properties.

BACKGROUND AND SUMMARY OF THE INVENTION

Thermoplastic polyester resins, such as polyalkylene terephthalate resins, are conventionally used as engineering plastics due to their excellent mechanical, electrical and moldability properties. However, thermoplastic polyester resins are flammable and thus are rendered flame-retardant—usually by means of an organic halogenated flame retardant and a flame-retarding auxiliary component—in situations where the resins are intended to form parts or components to be used in environments where nonflammability is required (e.g., components for electrical or electronic devices).

Reinforcing filler materials, such as glass fibers, are typically incorporated in thermoplastic polyester resin compositions so as to increase their mechanical strength and rigidity where such properties are required in the end use environment. In addition, where certain electrical characteristics are required, for example, arc and tracking resistance properties, polyester resins have been blended with talc or clay in combination with a flame retardant.

However, when a flame retardant or filler is incorporated into thermoplastic polyester resin, its mechanical properties, such as impact resistance and tenacity, are usually deleteriously affected. Thus, when thermoplastic polyester resins are used to form electrical components, such as connectors or timer cases, breakage problems may occur during molding, assembly and/or use. What has been needed therefore is a flame-retardant thermoplastic polyester resin having improved impact resistance and tenacity properties.

In this regard, it has been proposed to blend an impact resistance modifier, such as an elastomer, with thermoplastic polyester resin so as to improve its impact resistance properties. However, the improvements in impact resistance that result from such a proposal are still insufficient in terms of many end-use applications. Moreover, the addition of an elastomer to thermoplastic polyester resin usually is accompanied by diminished rigidity, thermal resistance, and/or electrical properties. Hence, further improvements in this field have been needed.

According to the present invention, a flame-retardant reinforced polyester resin composition containing an organic halogenated flame retardant and a filler is provided which exhibits improved impact resistance and tenacity, without sacrificing the polyester resin's excellent mechanical, electrical and/or thermal resistance properties. More specifically, the present invention is related to a thermoplastic polyester resin composition, which contains an organic halogenated flame retardant, an inorganic filler, and a specific phosphoric ester compound (to be discussed in greater detail below).

DETAILED DESCRIPTION OF THE PREFERRED EXEMPLARY EMBODIMENTS

As used herein and the accompanying claims, all weight percentages are based on the total weight of the composition, unless otherwise expressed.

A particularly preferred polyester composition according to the present invention includes:

(A) between about 25 to 93.5 wt. % of a thermoplastic polyester resin, (B) between about 1 to 30 wt. % of an organic halogenated flame retardant, (C) between about 5 to 60 wt. % of an inorganic filler, and (D) between about 0.5 to 20 wt. % of a phosphoric ester of the following formula (1):

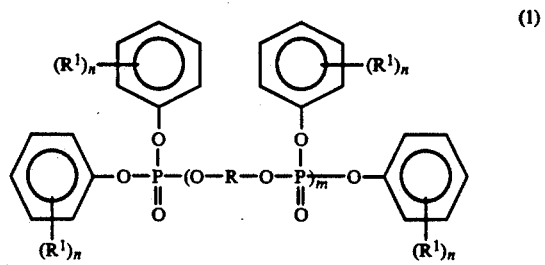

wherein R represents a divalent organic group, R', which may be the same or different, is selected from $C_1$ to $C_{20}$ aliphatic groups, $C_3$ to $C_{13}$ alicyclic groups and $C_6$ to $C_{18}$ aromatic groups, m represents a number of between 1 to 30 and n represents an integer between 0 to 3.

Proportions of the components (A) to (D) can be adjusted to achieve a total of 100%.

The thermoplastic polyester used as the base resin in the present invention is a polyester produced either by the polycondensation of a dicarboxylic acid with a dihydroxy compound, the polycondensation of a hydroxycarboxylic acid, or the polycondensation of all three such compounds. The present invention can be obtained using homopolyesters as well as copolyesters.

The dicarboxylic acids usable herein include, for example, known dicarboxylic acids such as terephthalic acid, isophthalic acid, naphthalenedicarboxylic acid, diphenyldicarboxylic acid, diphenyl ether dicarboxylic acid, diphenylethanedicarboxylic acid, cyclohexanedicarboxylic acid, adipic acid and sebacic acid as well as these compounds substituted with an alkyl, alkoxy or halogen. Furthermore, these dicarboxylic acids are usable in the form of an ester-forming derivative thereof such as a lower alcohol ester, e.g. dimethyl ester. The polyesters of the present invention as described above are used either alone or in combination of two or more of the same.

Examples of the dihydroxy compounds usable to form the polyesters of the present invention include ethylene glycol, propylene glycol, butanediol, neopentyl glycol, hydroquinone, resorcinol, dihydroxyphenyl, naphthalenediol, dihydroxydiphenyl ether, cyclohexanediol, 2,2-bis(4-hydroxyphenyl)-propane and diethoxybisphenol A, and polyoxyalkylene glycols as well as these compounds substituted with an alkyl, alkoxy or halogen. Again, such compounds may be alone or in combination of two or more the same.

The hydroxycarboxylic acids include, for example, hydroxybenzoic acid, hydroxynaphthoic acid and diphenyleneoxycarboxylic acid as well as these compounds substituted with an alkyl, alkoxy or halogen. Ester-forming derivatives of these compounds are also usable. The hydroxycarboxylic acids may be used either alone or in combination of two or more of the same.

In addition, polyesters having a branched or crosslinked structure produced by using a small amount of a trifunctional monomer such as trimellitic acid, trimesic acid, pyromellitic acid, pentaerythritol or trimethylolpropane are also usable.

Any of the thermoplastic polyesters produced by polycondensation of the above-described monomers can be used as the base polyester component (A) in the composition of the present invention. They may, moreover, be used either alone, or in the form of a mixture of two or more different polyesters. Among them, polyalkylene terephthalates, and particularly polybutylene terephthalate (PBT) and copolymers mainly comprising polybutylene terephthalate, are preferred.

The organic halogenated flame retardant to be incorporated in the thermoplastic polyester resin of the present invention may be any organic halogenated compound usually used as a flame-retardant for thermoplastic polyesters. Among them, aromatic brominated compounds are preferred, and include, for example, low-molecular weight brominated compounds, such as hexa- to decabrominated diphenyl ethers, low-molecular weight organic halogenated compounds derived from tetrabromobisphenol A, halogenated polycarbonates (such as polycarbonate oligomers produced from brominated bisphenol (A), halogenated epoxy compounds (such as diepoxy compounds produced by reacting a brominated bisphenol A with epichlorohydrin and monoepoxy compounds produced by reacting a brominated phenol with epichlorohydrin), brominated polystyrene and brominated bisimides (such as lower alkylenebistetrabromophthalimide).

The effect of the present invention can be obtained with any of the above-described flame retardants. Particularly, when a brominated epoxy flame retardant or brominated bisimide flame retardant is used, excellent thermal stability and moldability (high cycle moldability, freeness from mold corrosion, etc.) are obtained using an extrusion molding process. The effect is significantly evident in electric components, particularly those having a metallic contact, and thus are the preferred flame retardants. The organic halogenated flame retardants can be used either alone or in the form of a mixture of two or more of the same.

The amount of the organic halogenated flame retardant (B) is preferably as small as possible, since the mechanical properties of the composition are impaired when large amounts are used. Usually the organic halogenated flame retardant will be present in an amount between about 1 to 30 wt. % and more preferably between about 2 to 20 wt. %. The flame retardant is also most preferably used in combination with a flame retardant auxiliary compound.

The flame retardant auxiliary compounds usable herein include, for example, metal oxides and hydroxides such as antimony trioxide, antimony tetraoxide, antimony pentaoxide, antimony halides, aluminum hydroxide, magnesium hydroxide and tin dioxide. The amount of the flame retardant auxiliary compound that is used is between about 0 to 15 wt. %, preferably between about 1 to 10 wt. %.

When a flame retardant class VO according to UL Standard 94 is required of the composition, it is preferred to use the flame retardant in combination with asbestos or a fluororesin, such as polytetrafluoroethylene.

The inorganic fillers that may be used in the present invention are in and of themselves known, and are usually added to thermoplastic polyesters for the purpose of improving mechanical and/or physical properties such as strength, rigidity and hardness, as well as thermal and deformation resistances, and electrical properties. The fillers may be in a fibrous, platy, powdery or granular form, any particular form being selected in dependence upon the performance characteristics that are desired.

The fibrous fillers include inorganic fibrous materials such as glass fibers, carbon fibers, silica fibers, silica/alumina fibers, zirconia fibers, boron nitride fibers, silicon nitride fibers, boron fibers, potassium titanate fibers and fibers of metals such as stainless steel, aluminum, titanium, copper and brass. Among the, typical fibrous fillers are glass fibers and carbon fibers. . . Further high-melting inorganic fibrous material such as polyamides, fluororesin and acrylic resin are also usable.

The powdery or granular fillers include carbon black; silicates such as silica, quartz powder, glass beads, glass powder, calcium silicate, aluminum silicate, kaolin, talc, clay, diatomaceous earth and wollastonite; metal oxides such as iron oxides, titanium oxides, zinc oxides and alumina; metal carbonates such as calcium carbonate and magnesium carbonate; metal sulfates such as calcium sulfate and barium sulfate; silicon carbide; silicon nitride; boron nitride; and various metal powders.

The platy fillers include, for example, mica, glass flakes and various metal foils.

The effect of the present invention can be obtained with any of the above-described inorganic fillers. Among them, the powdery and platy fillers, particularly those mainly comprising talc, clay, glass beads, glass powder or glass flakes, are quite effective to inhibit reduction of impact resistance and tenacity.

The inorganic fillers can be used either alone or in combination of two or more of the same.

When using these fillers, it is also preferred to use, if necessary, a binder or a surface-treating agent. The binders and the surface-treating agents include, for example, functional compounds such as epoxy compounds, isocyanate compounds, silane compounds and titanate compounds. The fillers may be pre-treated with the surface-treating agent of the resin composition (e.g. during compounding) or binder, or alternatively, the binder or the surface-treating agent may be added in any step during the preparation.

The amount of the inorganic filler used in the present inventions is between about 5 to 60 wt. %, preferably between about 10 to 50 wt. %. When the amount of the inorganic filler exceeds 60 wt. %, the molding becomes difficult and the mechanical strength properties of the resulting molding are unsatisfactory. The amount of the functional surface-treating agent used together with the inorganic filler is between 0 to 10 wt. %, and more preferably between about 0.05 to 5 wt. %, based on the weight oft he inorganic filler.

Although flame-retardant thermoplastic polyester resins having excellent mechanical and electrical properties may be obtained by incorporating the above-described flame-retardants, if necessary, in combination with the flame retardant auxiliary components, the compositions have reduced impact resistance and tenacity (such as tensile elongation).

On the contrary, when a specific phosphoric ester compound (as defined below) is incorporated into the composition according to the present invention, the impact resistance and tenacity are significantly improved without impairing its physical properties, particularly its electrical properties. In addition, no problems relating to the thermal stability and fluidity during molding are experienced.

The phosphoric esters used for this purpose are represented by the following formula (1):

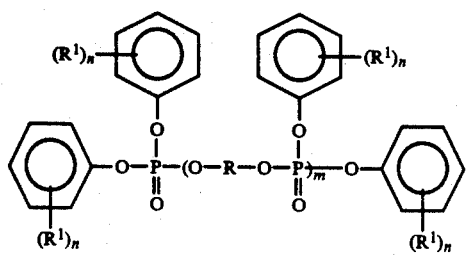

(1)

wherein R represents a divalent organic group, $R^1$, which maybe the same or different, is selected from $C_1$ to $C_{20}$ aliphatic groups, $C_3$ to $C_1$ alicyclic groups and $C_6$ to $C_{18}$ aromatic groups, m represents a number between 1 to 30, and n represents an integer between 0 to 3.

Any of phosphoric ester compound represented by the formula (1) can be used effectively by the compositions of this invention. R in the formula (1) is a divalent organic group selected from among $C_1$ to $C_{20}$ aliphatic groups, $C_3$ to $C_{13}$ alicyclic groups and $C_6$ to $C_{18}$ aromatic groups. Among the, aromatic groups are particularly preferred from the viewpoint of the thermal resistance needed during extrusion or molding. Particularly effective aromatic groups include, for example, the following:

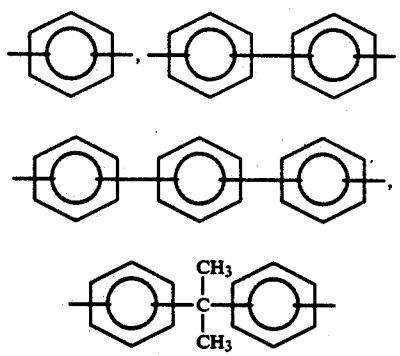

From the viewpoint of the cost of the starting material, R is preferably

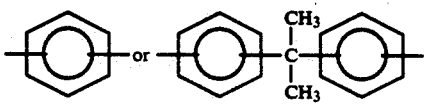

The groups represented by $R^1$ maybe the same or different from one another, are a $C_1$ to $C_{20}$ aliphatic group, a $C_3$ to $C_{13}$ alicyclic group, or a $C_6$ to $C_{18}$ aromatic group. Furthermore, even these phosphoric esters having no substituents, i.e. those phosphoric esters of the formula (1) wherein n is 0, serve to improve the impact resistance and tenacity, in addition to having sufficient heat resistance.

$R^1$ is preferably a methyl or isopropyl group. Particularly, a methyl group is most preferred, due to the balance between improved impact resistance, tenacity, thermal resistance, and blooming on the one hand, and the cost of the starting materials on the other hand. The integer n is preferably between 0 to 2, and particularly 0 or 1 is preferred from the viewpoint of blooming and thermal resistance. m, in formula (1) is at most 30 and is preferably at most 20.

The amount of the phosphoric ester of the above formula (1) used in the present invention is between about 0.5 to 20 wt. % and preferably 1 to 10 wt. %.

When an insufficient amount of the phosphoric ester is used, little beneficial effect is realized. On the other hand, when it is present in excess, the mechanical and physical properties of the resin composition are seriously impaired.

The polyester resin compositions of the present invention may optionally contain a small amount of other thermoplastic resins provided that the effect of the present invention is not impaired. These optional thermoplastic resins include, for example, polyamide, polycarbonate, ABS, polyphenylene oxide, polyphenylene sulfide, polyalkyl acrylate, polyacetal, polysulfone, polyether sulfone, polyetherimide, polyether ketone, phenoxy resin and fluororesin. The optional thermoplastic resins can be used either alone or in the form of a mixture of two or more of the same.

The compositions of the present invention may contain known additives in order to impart desired characteristics thereto. The additives include, for example, lubricants, nucleating agents, releasing agent, antistatic agents, surfactants, colorants, thermal stabilizer and/or U.V. stabilizers.

The compositions of the present invention can be easily produced by processes and in apparatus usually employed or used for the production of resin compositions. For example, the compositions can be produced by (i) mixing the components, followed by kneading and extruding the mixture to form pellets, and then molding the formed pellets, (ii) producing a master batch comprised of pellets having different compositions, and then molding the master batch to obtain moldings having an intended composition, or (iii) directly introducing one or more of the respective components into a molding machine. It is preferred that part of the resin components are finely pulverized and then mixed with the other components so as to form a homogeneous mixture.

The compositions of the present invention produced by incorporating the specified phosphoric ester in a thermoplastic polyester resin containing an organic halogenated flame retardant and the inorganic filler significantly overcomes problems associated with conventional polyester resins—i.e. reduction in the mechanical properties, particularly the tenacity (tensile elongation) due to the presence of flame-retardant and the inorganic filler. Particularly, when talc is used as the filler, the expected excellent electrical properties, particularly tracking resistance, can be maintained, while at the same time, any reduction in the resin's tenacity is inhibited. The compositions moreover maintain their flame retardancy, melt phase separation, thermal stability, and fluidity. As such, the compositions of the invention are particularly useful as a material to form electrical components (such as connectors or timer cases).

EXAMPLES

The following non-limiting Examples will further illustrate the present invention. The properties were evaluated by the following methods.
1) Physical Properties:
   Tensile test: ASTM D-638
   Impact strength: ASTM D-256
2) Tracking resistance:

The voltage (V) capable of being applied to the test pieces until tracking was observed was determined with a 0.1% aqueous NH$_4$Cl solution and platinum electrodes by the IEC method and the results were represented in terms of the comparative tracking index (CTI).

EXAMPLES 1 TO 10 AND COMPARATIVE EXAMPLES 1 to 7

A halogenated flame-retardant, flame-retardant assistant, talc and/or glass fibers and phosphoric ester shown in Table 1 were added in amounts shown in Table 1 to polybutylene terephthalate having an intrinsic viscosity of 1.0 and the mixture was pelletized with an extruder to obtain a composition in the form of the pellets.

Then the pellets were molded into test pieces by injection molding and the mechanical properties and tracking resistance of them were examined. The results are shown in Table 1.

For comparison, pellets free from the phosphoric ester were produced and tested in the same manner as above.

EXAMPLES 11 TO 13 AND COMPARATIVE EXAMPLES 8 to 10

A halogenated flame-retardant, flame-retardant assistant, inorganic filler and phosphoric ester were added to polybutylene terephthalate having an intrinsic viscosity of 0.8 in amounts shown in Table 2. The mechanical properties of the products were examined in the same manner as that of Example 1. The results are shown in Table 2.

For comparison, pellets free from the phosphoric ester were produced and tested in the same manner as above.

The phosphoric ester D-1, D-2 and D-3 are shown below.

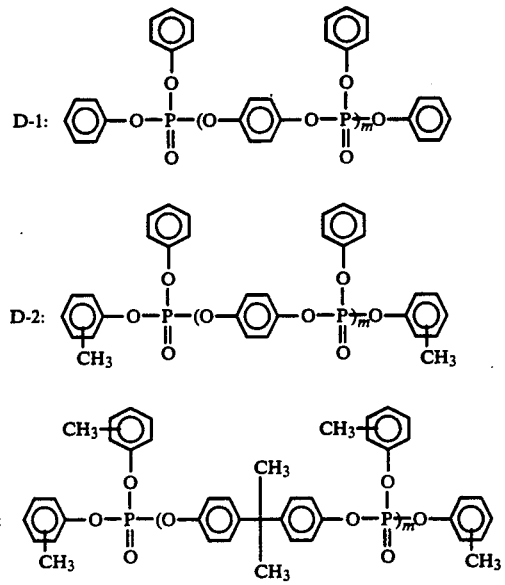

TABLE 1

| | | Unit | Example 1 | 2 | 3 | 4 | 5 | 6 | 7 | 8 |
|---|---|---|---|---|---|---|---|---|---|---|
| Composition | (A) Polybutylene terephthalate | wt. % | 58.5 | 60.5 | 58.5 | 58.5 | 45.5 | 48.5 | 58.5 | 57.5 |
| | (B) Ethylenebistetrabromo-phthalimide | " | 9.0 | 9.0 | 9.0 | 9.0 | 7.0 | 9.0 | 9.0 | |
| | (B) Brominated epoxy-modified resin | " | | | | | | | | 12.0 |
| | (B) Decabromodiphenyl ether | " | | | | | | | | |
| | Antimony trioxide | " | 8.0 | 8.0 | 8.0 | 8.0 | 3.0 | 8.0 | 8.0 | 6.0 |
| | Polytetrafluoroethylene | " | 0.5 | 0.5 | 0.5 | 0.5 | 0.5 | 0.5 | 0.5 | 0.5 |
| | (C) Talc | " | 20 | 20 | 20 | 20 | 40 | 20 | | 20 |
| | (C) Glass fibers | " | | | | | | 10 | 20 | |
| | (D) Phosphoric ester | | | | | | | | | |
| | D-1 | " | 4 | | | | | | | |
| | D-2 | " | | 2 | 4 | | 4 | 4 | 4 | 4 |
| | D-3 | " | | | | 4 | | | | |
| Physical properties | Tensile strength | kg/cm$^2$ | 495 | 525 | 485 | 481 | 420 | 865 | 1060 | 480 |
| | Tensile elongation | % | 4.1 | 3.1 | 4.7 | 4.6 | 3.2 | 4.6 | 4.5 | 4.0 |
| | Izod impact strength (with notch) | kg · cm/cm | 3.6 | 3.4 | 4.0 | 3.9 | 3.5 | 4.6 | 7.0 | 3.9 |
| | Tracking resistance (CTI) | V | 400 | 400 | 425 | 400 | 575 | 375 | 250 | 425 |

| | | Unit | Example 9 | 10 | Comparative Example 1 | 2 | 3 | 4 | 5 | 6 | 7 |
|---|---|---|---|---|---|---|---|---|---|---|---|
| Composition | (A) Polybutylene terephthalate | wt. % | 47.5 | 60.5 | 62.5 | 49.5 | 52.5 | 62.5 | 61.5 | 51.5 | 64.5 |
| | (B) Ethylenebistetrabromo-phthalimide | " | | | 9.0 | 7.0 | 9.0 | 9.0 | | | |
| | (B) Brominated epoxy-modified resin | " | 12.0 | | | | | | 12.0 | 12.0 | |
| | (B) Decabromodiphenyl ether | " | | 8.0 | | | | | | | 8.0 |
| | Antimony trioxide | " | 6.0 | 7.0 | 8.0 | 3.0 | 8.0 | 8.0 | 6.0 | 6.0 | 7.0 |
| | Polytetrafluoroethylene | " | 0.5 | 0.5 | 0.5 | 0.5 | 0.5 | 0.5 | 0.5 | 0.5 | 0.5 |

TABLE 1-continued

|  |  |  |  |  |  |  |  |  |  |  |  |
|---|---|---|---|---|---|---|---|---|---|---|---|
|  | (C) Talc | " | 20 | 20 | 20 | 40 | 20 |  | 20 | 20 | 20 |
|  | (C) Glass fibers | " |  |  | 10 |  |  | 10 | 20 |  | 10 |  |
|  | (D) Phosphoric ester |  |  |  |  |  |  |  |  |  |  |  |
|  | D-1 | " |  |  |  |  |  |  |  |  |  |  |
|  | D-2 | " | 4 | 4 |  |  |  |  |  |  |  |  |
|  | D-3 | " |  |  |  |  |  |  |  |  |  |  |
| Physical | Tensile strength | kg/cm² | 845 | 470 | 535 | 450 | 950 | 1180 | 520 | 930 | 525 |
| properties | Tensile elongation | % | 3.9 | 3.5 | 1.6 | 1.2 | 1.7 | 3.0 | 2.0 | 1.9 | 1.9 |
|  | Izod impact strength (with notch) | kg·cm/cm | 4.7 | 3.4 | 2.8 | 2.6 | 3.4 | 6.2 | 3.0 | 3.8 | 2.9 |
|  | Tracking resistance (CTI) | V | 375 | 375 | 400 | 550 | 350 | 225 | 400 | 350 | 400 |

TABLE 2

|  |  |  | Example | | | Comparative Example | | |
|---|---|---|---|---|---|---|---|---|
|  |  | Unit | 11 | 12 | 13 | 8 | 9 | 10 |
| Composition | (A) Polybutylene terephthalate | wt. % | 48.5 | 48.5 | 48.5 | 52.5 | 52.5 | 52.5 |
|  | (B) Ethylenebistetrabromophthalimide | " | 9.0 | 9.0 | 9.0 | 9.0 | 9.0 | 9.0 |
|  | Antimony trioxide | " | 8.0 | 8.0 | 8.0 | 8.0 | 8.0 | 8.0 |
|  | Polytetrafluoroethylene | " | 0.5 | 0.5 | 0.5 | 0.5 | 0.5 | 0.5 |
|  | (C) Glass beads | " | 30 |  |  | 30 |  |  |
|  | (C) Glass flakes | " |  | 30 | 15 |  | 30 | 15 |
|  | (C) Glass fibers | " |  |  | 15 |  |  | 15 |
|  | (D) Phosphoric ester D-2 | " | 4.0 | 4.0 | 4.0 |  |  |  |
| Physical | Tensile strength | kg/cm² | 465 | 650 | 1030 | 515 | 710 | 1110 |
| properties | Tensile elongation | % | 3.4 | 4.5 | 4.3 | 2.0 | 2.3 | 2.5 |
|  | Izod impact strength (with notch) | kg·cm/cm | 3.1 | 5.0 | 6.0 | 2.3 | 3.9 | 5.0 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A flame-retardant polybutylene terephthalate resin composition comprising, based on the total weight of the composition;
   (A) between 25 to 93.5 wt. % of a thermoplastic polybutylene base resin;
   (B) between about 1 to about 30 wt. % of an organic halogenated flame-retardant;
   (C) between about 5 to 60 wt. % of an inorganic filler material which is at least one selected from the group consisting of talc, clay, glass beads, glass powder and glass flakes; and
   (D) between about 1.0 to 10 wt. % of a phosphoric ester of the following formula (1):

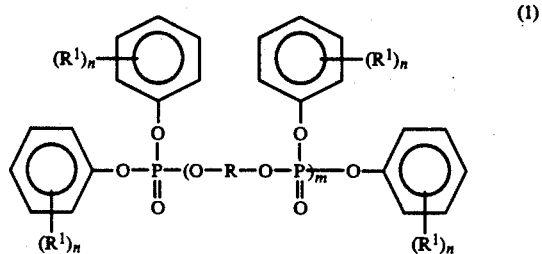

(1)

wherein R and R', which may be the same or different are each a divalent organic group selected from $C_1$ to $C_{20}$ aliphatic groups, $C_3$ to $C_{13}$ alicyclic groups, and $C_6$ to $C_{18}$ aromatic groups, m represents a number between 1 and 30, and n represents an integer between 0 and 3.

* * * * *

UNITED STATES PATENT AND TRADEMARK OFFICE
CERTIFICATE OF CORRECTION

PATENT NO.  : 5,135,973
DATED       : August 4, 1992
INVENTOR(S) : FUKASAWA et al It is certified that error appears in the above-identified patent and that said Letters Patent is hereby corrected as shown below:

Column 3, line 33, after "bisphenol" delete the first parenthesis "(" before "A)".

Column 5, line 66, after "$R^1$" delete "maybe" and insert --, which may be--.

Column 6, line 1, after "even" delete "these" and insert --those--
line 38, after "releasing" change "agent" to --agents--;
line 39, after "thermal" change "stabilizer" to --stabilizers--;
line 63, after "of" and before "flame-retardant" insert --the--.

Signed and Sealed this

Thirty-first Day of August, 1993

Attest:

BRUCE LEHMAN

Attesting Officer    Commissioner of Patents and Trademarks